US012794156B2

(12) United States Patent
Justi et al.

(10) Patent No.: US 12,794,156 B2
(45) Date of Patent: Nov. 10, 2026

(54) ELECTRICAL CONTACT ELEMENT FOR AN ELECTRICAL CONNECTOR, AND ELECTRICAL CONNECTOR ASSEMBLY HAVING AN ELECTRICAL ELEMENT

(71) Applicant: KOSTAL Kontakt Systeme GmbH, Luedenscheid (DE)

(72) Inventors: Joern Justi, Luedenscheid (DE); Meik Meckelmann, Luedenscheid (DE); Johannes Ludolfs, Hagen (DE)

(73) Assignee: KOSTAL Kontakt Systeme GmbH & Co. KG, Luedenscheid (DE)

( * ) Notice: Subject to any disclaimer, the term of this patent is extended or adjusted under 35 U.S.C. 154(b) by 438 days.

(21) Appl. No.: 18/524,539

(22) Filed: Nov. 30, 2023

(65) Prior Publication Data

US 2024/0097368 A1 Mar. 21, 2024

Related U.S. Application Data

(63) Continuation of application No. PCT/EP2022/066162, filed on Jun. 14, 2022.

(30) Foreign Application Priority Data

Jun. 22, 2021 (DE) ..................... 10 2021 003 221.7

(51) Int. Cl.
*H01R 13/04* (2006.01)
*H01R 13/11* (2006.01)
(Continued)

(52) U.S. Cl.
CPC ............. *H01R 13/04* (2013.01); *H01R 13/11* (2013.01); *H01R 13/44* (2013.01); *H01R 13/187* (2013.01)

(58) Field of Classification Search
CPC ........ H01R 13/04; H01R 13/11; H01R 13/44; H01R 13/187
(Continued)

(56) References Cited

U.S. PATENT DOCUMENTS 2,537,370 A 1/1951 Parnes
4,298,237 A 11/1981 Griffith et al.
(Continued)

FOREIGN PATENT DOCUMENTS

DE 112017003854 T5 4/2019
DE 102018211043 A1 1/2020
(Continued)

OTHER PUBLICATIONS

The International Bureau of WIPO, International Preliminary Report on Patentability for International Application No. PCT/EP2022/066162 issued Dec. 14, 2023.
(Continued)

*Primary Examiner* — Harshad C Patel
(74) *Attorney, Agent, or Firm* — Brooks Kushman P.C.

(57) ABSTRACT

An electrical contact element (ECE) for a plug connector includes a metal flat contact plug and a plastic body. The plastic body has a plug tip disposed on an insertion-side end face of the flat contact plug. The plug tip has a cross-sectional area including two undulated edge contours which extend symmetrically or asymmetrically with respect to a center axis of the cross-sectional area. A cross-sectional width between the edge contours varies continuously along the plug tip and has a local maximum(s) outside of end regions of the plug tip. The plug connector may include a mating contact element (MCE) having contact slats which contact the edge contours of the plug tip as the ECE is partially inserted along an insertion direction into the MCE and contact the contact surfaces of the flat contact plug as the
(Continued)

ECE is fully inserted along the insertion direction into the MCE.

14 Claims, 6 Drawing Sheets

(51) Int. Cl.
*H01R 13/44* (2006.01)
*H01R 13/187* (2006.01)

(58) Field of Classification Search
USPC .......................................................... 439/884
See application file for complete search history.

(56) References Cited

U.S. PATENT DOCUMENTS

| | | | | |
|---|---|---|---|---|
| 6,860,746 | B2 * | 3/2005 | Ota | H01R 13/03 439/886 |
| 6,918,800 | B2 * | 7/2005 | Ota | H01R 13/03 439/886 |
| 7,262,363 | B2 * | 8/2007 | Fukuda | H02G 15/043 174/84 C |
| 8,951,051 | B2 * | 2/2015 | Natter | H01R 13/04 439/135 |
| 9,431,739 | B2 | 8/2016 | Fukushima et al. | |
| 10,855,018 | B2 | 12/2020 | Duenkel et al. | |
| 11,469,542 | B2 * | 10/2022 | Bailey | H01R 13/5213 |
| 11,539,149 | B2 * | 12/2022 | Kobayashi | H01R 9/24 |
| 11,569,604 | B2 * | 1/2023 | Kobayashi | H01R 13/44 |
| 2006/0148287 | A1 * | 7/2006 | Zahnen | H01R 13/5213 439/135 |
| 2011/0053404 | A1 * | 3/2011 | Tsuruta | H01R 13/4365 439/345 |
| 2014/0329396 | A1 | 11/2014 | Okayasu et al. | |
| 2018/0034198 | A1 | 2/2018 | Lyon et al. | |
| 2020/0014140 | A1 | 1/2020 | Duenkel et al. | |
| 2020/0161795 | A1 | 5/2020 | Aoki | |

FOREIGN PATENT DOCUMENTS

| | | | |
|---|---|---|---|
| EP | 2109187 | A1 | 10/2009 |
| EP | 2660936 | A1 | 11/2013 |
| EP | 3591768 | A1 | 1/2020 |
| JP | 2014179290 | A | 9/2014 |

OTHER PUBLICATIONS

European Patent Office, International Search Report for International Application No. PCT/EP2022/066162, dated Oct. 10, 2022.
German Patent and Trademark Office, German Search Report for corresponding German Patent Application No. DE 10 2021 003 221.7 dated Dec. 20, 2021.

* cited by examiner (Background)

ELECTRICAL CONTACT ELEMENT FOR AN ELECTRICAL CONNECTOR, AND ELECTRICAL CONNECTOR ASSEMBLY HAVING AN ELECTRICAL ELEMENT

CROSS-REFERENCE TO RELATED APPLICATIONS

This application is a continuation of International Application No. PCT/EP2022/066162, published in German, with an international filing date of Jun. 14, 2022, which claims priority to DE 10 2021 003 221.7, filed Jun. 22, 2021, the disclosures of which are incorporated in their entirety by reference herein.

TECHNICAL FIELD

The present invention relates to an electrical contact element for a plug connector, the electrical contact element including a metal flat contact plug and a plastic body that is arranged at least on the plug-side end face of the flat contact plug. The present invention further relates to an electrical connector assembly having such an electrical contact element.

BACKGROUND

Electrical circuits with fairly high voltages must be safeguarded to protect against injury or death. For this reason, plug connections, particularly in the engine compartment, have been provided with a touch-protected design in the automotive industry for many decades.

Various concepts for protection against touch have been known for many years by manufacturers and designers of plug connectors and are applied in their products.

So-called passively touch-protected plug connectors have appropriate geometries to rule out accidental contact.

A generic electrical contact element having touch protection (or contact protection) made of plastic is known from German published patent application DE 10 2018 211 043 A1 (corresponds to U.S. Pat. No. 10,885,018).

In particular, the section of the plastic body resting against the plug-side (or the insertion-side) end face of the flat contact plug affects or influences the properties of the electrical contact element during the plug-in (or the insertion) operation. Depending on the geometry of the plastic body section, relatively high insertion forces or even an unfavorable profile of the insertion forces may result during the plug-in operation. In addition, plastic abrasion that occurs during the plug-in operation depends on the geometry of the plastic body section.

The shape of the plastic body should also make it as difficult as possible for a finger to approach the flat contact plug in a given environment.

SUMMARY

An object is to provide an electrical contact element having a particularly advantageous design with regard to these requirements.

In embodiments of the present invention, an electrical contact element (or plug contact element) for an electrical connector (or plug connector) includes a metal flat contact plug and a plastic body. The plastic body has a plug tip disposed on a plug-side (or insertion-side) end face of the flat contact plug. The plug tip extends from the plug-side end face of the flat contact plug along a plug-in direction (insertion direction) of the electrical contact element. The plug tip has a cross-sectional area having two undulatory (or wavy) edge contours. The wavy edge contours run along the plug tip symmetrically or asymmetrically to the center axis of the cross-sectional area. A distance between the wavy edge contours along the plug tip varies continuously. The distance between the wavy edge contours along the plug tip has at least one local maximum located outside of end regions of the plug tip.

In other embodiments of the present invention, an electrical connector assembly (or plug connector assembly) includes an electrical connector and a mating contact element (or mating connector). The electrical connector includes the electrical contact element. The mating contact element includes one or more contact slats.

Embodiments of the present invention achieve the above object and/or other objects in that the plug tip of the plastic body, which extends from the insertion-side end face of the flat contact plug, has a cross-sectional area having two undulated (or wavy) edge contours which extend symmetrically or asymmetrically with respect to the center axis of the cross-sectional area, and the distance (or spacing) between the edge contours varies continuously along the insertion direction, and the distance between the edge contours over the profile of the cross-sectional area has at least one local maximum outside of end regions of the plug tip.

The distance between the edge contours, measured perpendicularly with respect to the center axis of the cross-sectional area, is also referred to herein by the term "cross-sectional width."

Such a profile of the cross-sectional area of the portion of the plastic body extending from the insertion-side end face of the flat contact plug has been proven to be advantageous as it keeps both the insertion forces, which arise when a resilient mating contact is plugged in, and the plastic abrasion that occurs at the plastic body, relatively low. Low insertion forces simplify the handling of plug connectors that include such contact elements. Low plastic abrasion is desirable as plastic abrasion in particular also adversely affects the electrical properties of the electrical contact element.

A doubly undulated profile of the edge contours of the plug tip of the plastic body has proven to be particularly advantageous.

BRIEF DESCRIPTION OF THE DRAWINGS

Advantageous embodiments and refinements of the present invention arise from the following description of an electrical contact element and an electrical connector assembly in accordance with embodiments of the present invention with reference to the drawings, which include the following.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
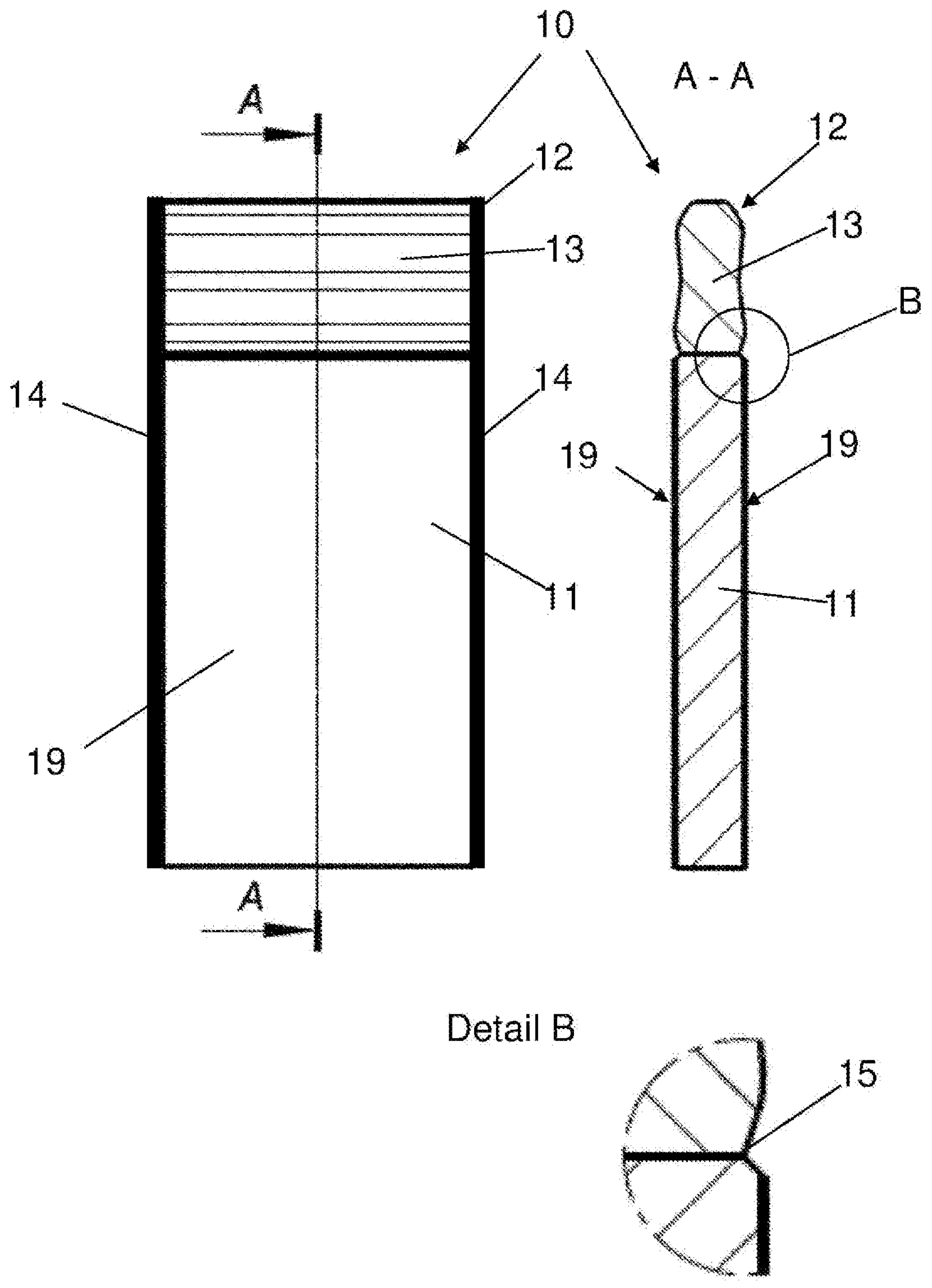
FIG. 1 illustrates a plan view, a sectional view A-A, and an enlarged detail view B of an electrical contact element in accordance with an embodiment of the present invention, the electrical contact element having a metal flat contact plug and a plastic body.

Referring now to FIG. 1, an electrical contact element 10 (or plug contact element) in accordance with an embodiment of the present invention will be described. FIG. 1 illustrates a plan view, a sectional view A-A, and an enlarged detail view B of electrical contact element 10.

Electrical contact element 10 includes a metal flat contact plug 11 and a plastic body 12. Plastic body 12 is molded onto flat contact plug 11. Plastic body is electrically, non-conductive.

Plastic body 12, designed in one piece (i.e., a one-piece plastic body), surrounds flat contact plug 11 from multiple sides. Plastic body 12 includes side portions 14 which rest against the two narrow longitudinal sides of flat contact plug 11. Plastic body 12 further includes a plug tip 13. Plug tip 13 connects side portions 14. Plug tip 13 is situated at the insertion-side end face of flat contact plug 11. Plug tip 13 extends from the insertion-side end face of flat contact plug 11 along a plug-in direction (insertion direction) of electrical contact element 10.

Plug tip 13, by virtue of being electrically nonconductive, has the function of preventing the end face of flat contact plug 11 from being directly touched by a human body part.

The same touch prevention function is achieved by the two side portions 14 for the two narrow longitudinal sides of flat contact plug 11. Plastic body 12 thus provides protection against touch for flat contact plug 11.

Options for accessing the front and rear sides of contact surfaces 19 of flat contact plug 11, which must be kept free for the contacting by a mating contact element 20 (FIG. 2), are limited, in a manner basically known, by housing parts of a plug connector housing (not shown) that enclose electrical contact element 10.

Plug tip 13 is formed by plastic body 12 and is characterized in that each of its two edge surfaces in cross section forms at least one simple undulated contour (or simple wave contour). In the examples illustrated here, a doubly undulated contour (or double wave contour) is depicted in each case.

Figure 2:
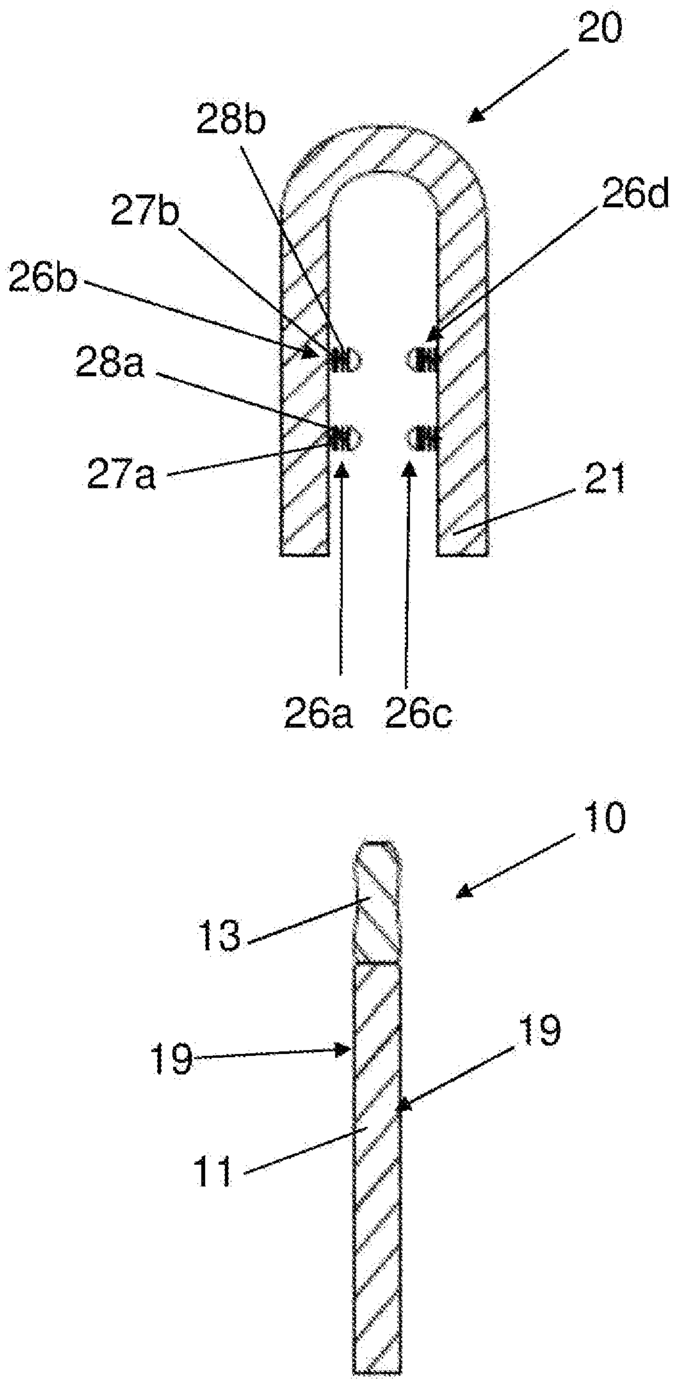
FIG. 2 illustrates a sectional view of an electrical connector assembly in accordance with an embodiment of the present invention, the electrical connector assembly having the electrical contact element and a mating contact element.

Referring now to FIG. 2, electrical contact element 10 is provided to form with a mating contact element 20 (or mating plug connector) an electrical connector assembly (or plug connector assembly). As such, the electrical connector assembly includes electrical contact element 10 and mating contact element 20.

For forming the electrical connector assembly with electrical contact element 10, mating contact element 20 has multiple lamellae (or contact slats) 26*a*, 26*b*, 26*c*, and 26*d* arranged on a support component 21. Support component 21 has a U-shape whereby contact slats 26*a* and 26*c* on opposite sides of support component 21 are oppositely facing; and contact slats 26*b* and 26*d* on the opposite sides of support component 21 are oppositely facing. Contact slats 26*a* and 26*b* on one side of support component 21 follow one another in succession along the plug-in direction. Contact slats 26*c* and 26*d* on the opposite side of support component 21 follow one another in succession along the plug-in direction. Further contact slats may be provided in parallel to contact slats 26*a*, 26*b*, 26*c*, 26*d*, in a plane parallel to the plane of the drawing (not shown in FIG. 2).

Each contact slat 26*a*, 26*b*, 26*c*, 26*d* has a resilient section, which is illustrated here as a cylindrical spring for simplification, and which is referred to herein as a slat spring. Slat springs 27*a*, 27*b* of contact slats 26*a*, 26*b* are identified with reference numerals in FIG. 2. Each slat spring has a slat tip connected thereto. Slat tips 28*a*, 28*b* connected to slat springs 27*a*, 27*b* of contact slats 26*a*, 26*b* are identified with reference numerals in FIG. 2. The slat tips rest against one of contact surfaces 19 of flat contact plug 11 of electrical contact element 10 when electrical contact element 10 is fully plugged into mating contact element 20.

When electrical contact element 10 is plugged into mating contact element 20, slat tips 28*a*, 28*b* initially touch the edge surfaces of plug tip 13 and then touch contact surfaces 19 of flat contact plug 11. Due to the elastic forces of slat springs 27*a*, 27*b*, insertion forces arise when electrical contact element 10 is plugged into mating contact element 20. The magnitude and profile of the insertion forces are determined by the design of slat springs 27*a*, 27*b* and by the cross-sectional shape of electrical contact element 10.

While flat contact plug 11 generally has a simple design with plane-parallel contact surfaces 19, the shape of plug tip 13, made of an insulation material, may in principle be varied. However, simple cross-sectional shapes have usually been selected thus far for an insulating plug tip as its purpose, besides the function for protection against touch, is generally regarded as only for opening contact slats 26 of mating contact element 20 wide enough so that the contact slats may slide over plug tip 13 and onto contact surfaces 19 of flat contact plug 11.

Figure 5:
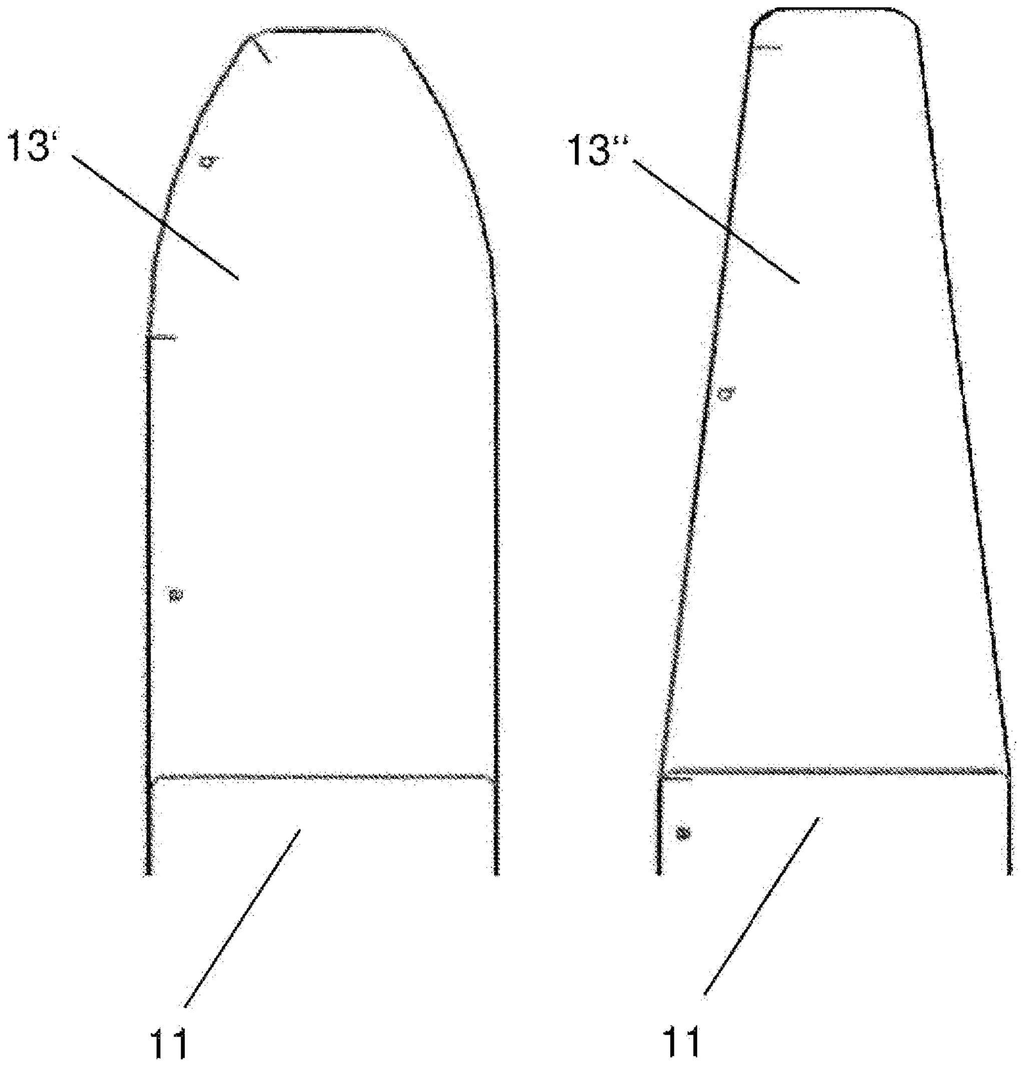
FIG. 5 illustrates a cross-sectional view of a first conventional plug tip and a cross-sectional view of a second conventional plug tip.

FIG. 5 illustrates, by way of example, two conventional designs of an insulating plug tip. More particularly, FIG. 5 illustrates a cross-sectional view of a first conventional plug tip 13' and a cross-sectional view of a second conventional plug tip 13". The front surface of first conventional plug tip 13' forms a type of tip whose cross section attains the cross-sectional width of flat contact plug 11 after only a short distance in the insertion direction. For first conventional plug tip 13', a very high level of force must be applied to expand the contact slats, particularly at the start of the insertion operation. The front surface of second conventional plug tip 13" forms a wedge-shaped type of tip in which the insertion force continuously increases until flat contact plug 11 is reached.

Figure 3:
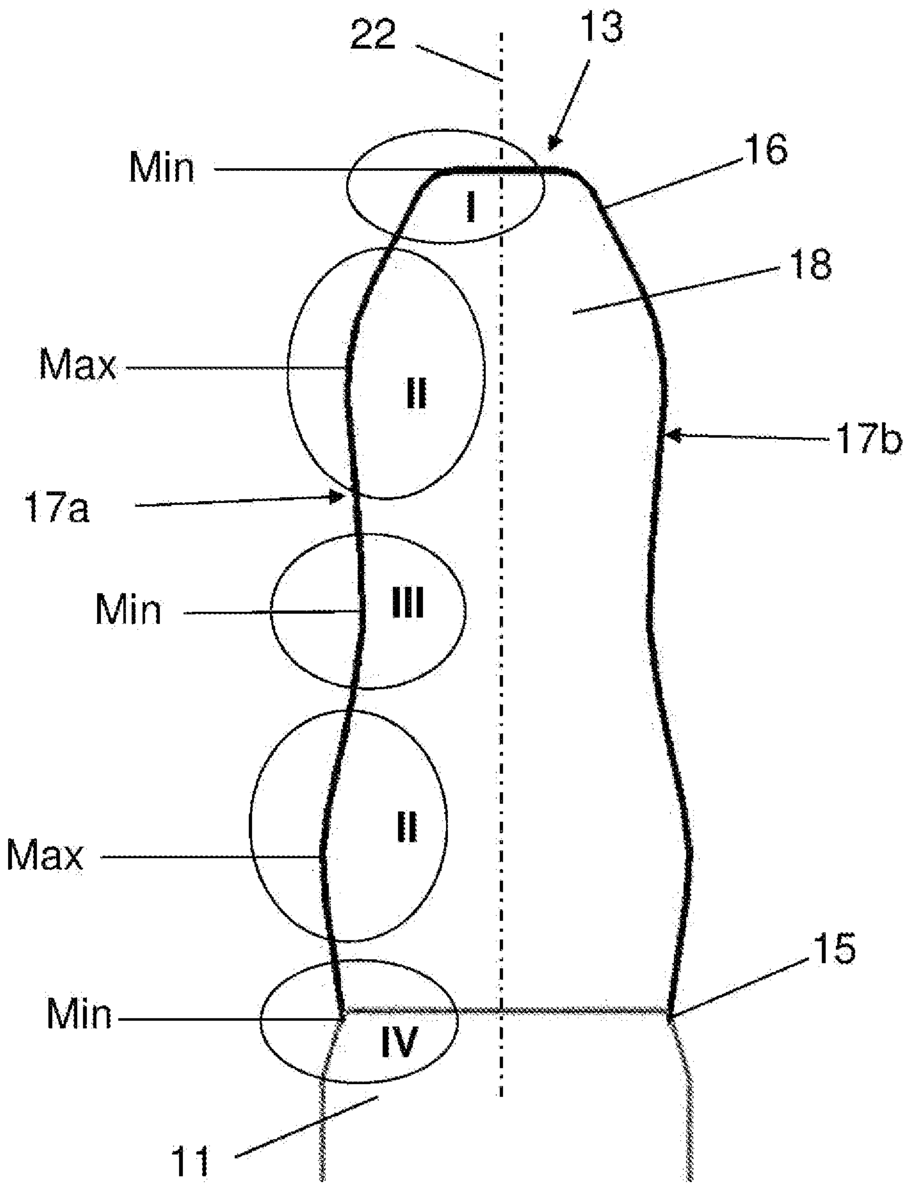
FIG. 3 illustrates a cross-sectional view of a plug tip of the plastic body of the electrical contact element, the plug tip being a portion of the plastic body which extends from an insertion-side end face of the flat contact plug of the electrical contact element.

For electrical contact element 10 in accordance with the present invention, a new shape of plug tip 13 has been found which optimizes the insertion force profile when electrical contact element 10 is inserted into mating contact element 20. For this purpose, FIG. 3 illustrates a vertical cross section of electrical contact element 10 in the region of plug tip 13. Edge contours 17*a*, 17*b* of cross-sectional area 18 of plug tip 13 are divided into multiple encircled zones I, II, Ill, and IV for the following discussion.

The two edge contours 17*a*, 17*b* of cross-sectional area 18 of plug tip 13, which are shown here by way of example as extending symmetrically relative to one another with respect to a center axis 22 of cross-sectional area 18 of plug tip 13, each have an undulated (or wavy) profile. In particular, the two edge contours 17*a*, 17*b* have a doubly undulated shape. As shown in FIG. 3, this doubly undulated shape is characterized in that the cross-sectional width between edge contours 17*a*, 17*b* in the insertion direction varies continuously, and the profile of the cross-sectional width has two cross-sectional maxima Max (zones II) which do not lie at the front or rear end sections of edge contours 17*a*, 17*b*. (The rear end sections of edge contours 17*a*, 17*b* are at the portion of plug tip 13 adjacent to flat contact plug 11 and the front end sections of edge contours 17*a*, 17*b* are at the free end of plug tip 13.)

Specifically, the shape of plug tip 13 as shown in FIG. 3 has two elevated zones II, each forming a local maximum Max of the cross-sectional width, and a valley zone III, forming a local minimum Min of the cross-sectional width. Valley zone III is situated between the two elevated zones II.

The front and rear end sections of edge contours 17*a*, 17*b* likewise in each case forms a local minimum Min in the cross-sectional width in the plastic plug bevel zone I and in the indented zone IV. In the plastic plug bevel zone I, the profile of each edge contour 17*a*, 17*b* begins with an integrally formed bevel 16.

The plastic surface of plug tip 13 and the metal surface of flat contact plug 11 meet in the indented zone IV at an angle of 90° to 179° in a concave material transition region, referred to herein as an indentation 15.

Figure 4:
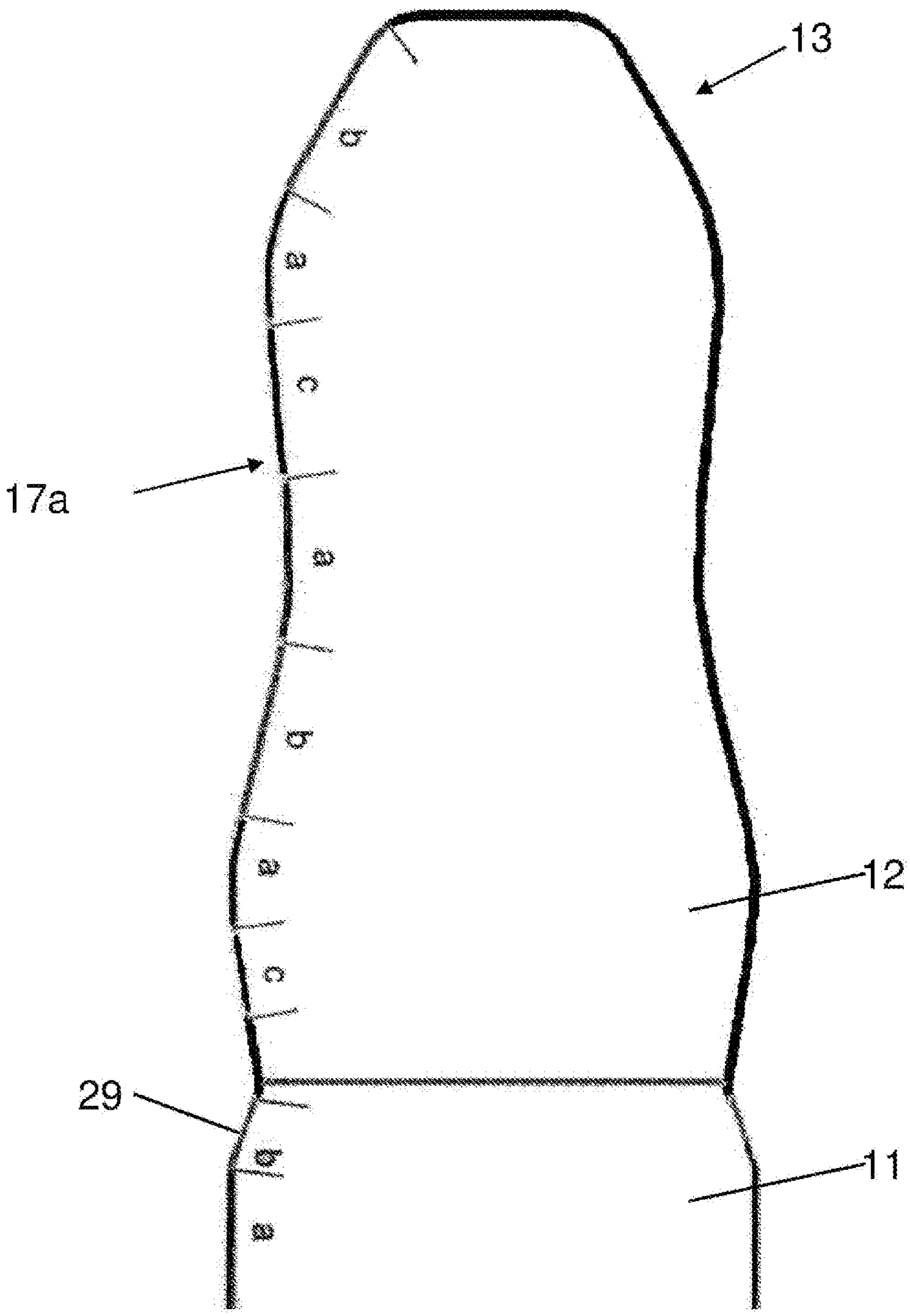
FIG. 4 illustrates a cross-sectional view of the plug tip of the plastic body of the electrical contact element with marked contact surfaces.

Referring now to FIG. 4, with continual reference to FIG. 3, a cross-sectional view of plug tip 13 of plastic body 12 with marked contact surfaces is shown. The metal area in the material transition region is designed in such a way that an angular transition 29 is ensured. Angular transition 29 may be created by forming a bevel, a radius, an edge, or a polynomial shape. Indentation 15 ensures that no contact takes place between electrical contact element 10 and the slat tips of mating contact element 20 in the material transition region.

Due to the undulated shape (wave shape) of plug tip 13, multiple qualitatively differently acting contact zones a, b, c result on account of different slopes in the curve pattern with regard to an insertion operation. The contact zones a, b, c in the cross-sectional view of plug tip 13 in FIG. 4 are plotted along an edge contour 17*a* of plug tip 13.

Contact zones a (i.e., those contact zones designated with the designation "a") are contact zones in which contact slats 26*a*, 26*b*, 26*c*, 26*d* are able to slide without expanding as electrical contact element 10 is plugged into mating contact element 20. Contact zones b (i.e., those contact zones designated with the designation "b") are contact zones in which in each case an expansion of the contact slats takes place as electrical contact element 10 is plugged into mating contact element 20. Contact zones c (i.e., those contact zones designated with the designation "c") are contact zones in which the slat springs of the contact slats are relieved of stress as electrical contact element 10 is plugged into mating contact element 20.

Over the entire contour of plastic body 12, slat tips 28*a*, 28*b* touch electrical contact element 10 in succession in all three contact zones a, b, c. This results in an application of force, due to expansion work by contact slats 26*a*, 26*b*, 26*c*, 26*d*, only when one of the slat tips 28*a*, 28*b* passes over one of the "b" contact zones. The contact slats can slide over the "a" contact zones without any expansion work, while slat springs 27*a*, 27*b* of the respective contact slats 26*a*, 26*b*, 26*c*, 26*d* are even relieved of stress when traveling over the "c" contact zones.

In contrast, for conventional plug tips 13', 13" illustrated in FIG. 5, there are no "c" contact zones which from time to time relieve the slat springs of stress.

Utilization of multiple touch surfaces protects the contact slats, and when electrical contact element 10 is connected to mating contact element 20, can distribute over the entire insertion profile the force that is to be applied. Stress regions and stress relief regions of contact slats 26*a*, 26*b*, 26*c*, 26*d* may be clocked.

When plug tip 13 has a multiply undulated contour, as illustrated in FIGS. 3 and 4, the distance between the undulations is designed in such a way that slat tips 28*a*, 28*b* of mating contact element 20, arranged in succession, at the same time come into contact with regions of plug tip 13, which have greatly different cross-sectional widths.

Figure 6:
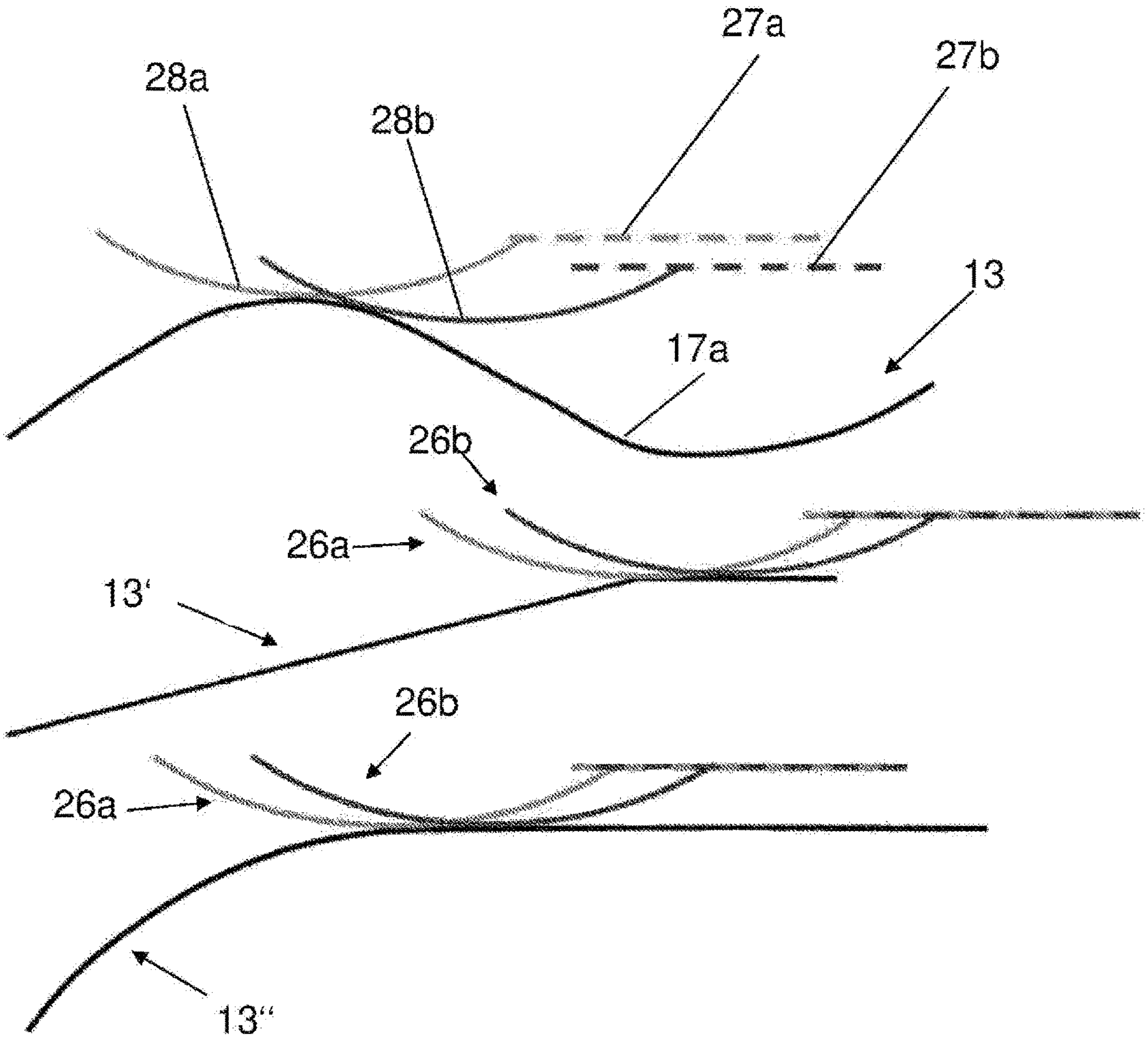
FIG. 6 illustrates a schematic view of a pair of contact slats of a mating contact element at an edge contour of the plug tip of the plastic body of the electrical contact element (top view), a schematic view of the pair of contact slats at the edge contour of the first conventional plug tip (middle view), and a schematic view of the pair of contact slats at the edge contour of the second conventional plug tip (bottom view).

This is schematically illustrated in the top view of FIG. 6, which pertains to plug tip 13. It is apparent that slat tips 28*a*, 28*b* resting against an undulated edge contour 17*a* deflect slat springs 27*a*, 27*b* connected thereto, in the state of maximum stress on the trailing contact point here, to different extents. For an undulated contour having the profile of edge contour 17*a* of plug tip 13, this occurs multiple times.

Due to the alternating stress regions and stress relief regions of slat springs 27*a*, 27*b*, the insertion forces in the region of the Max zones II (FIG. 3) are limited, as a result of which the occurrence of extreme force peaks may be avoided.

In comparison, the middle view of FIG. 6 schematically illustrates the edge contour of first conventional plug tip 13' and the bottom view of FIG. 6 schematically illustrates the edge contour of second conventional plug tip 13". In the state of maximum deflection of contact slat 26*b*, which is trailing here, contact slat 26*a*, which is leading here, can only be on the same level, which results in force peaks.

The insertion forces that occur during an insertion operation are made up of contributions for the setting work of slat springs 27*a*, 27*b*, friction forces due to the surface condition of electrical contact element 10 and slat tips 28*a*, 28*b*, the shaping of edge contours 17*a*, 17*b*, and the expansion work at slat springs 27*a*, 27*b*. The individual contributions vary over the profile of the insertion region.

The setting work refers to the mechanical work that must be performed for a lasting plastic deformation of slat springs 27*a*, 27*b*. Therefore, the setting work need be performed only once during the first use of a mating contact element 20. The one-time mechanical setting work is completed when the maximum deflection of slat springs 27*a*, 27*b* is reached, and is therefore determined by the maximum cross section of electrical contact element 10.

A plug tip 13 having an undulated edge contour distributes the setting work in the force-displacement characteristic over multiple regions. Slat springs 27*a*, 27*b* may be deflected in succession by means of the doubly undulated plug.

The shaping of the undulated edge contours 17*a*, 17*b* of plastic body 12 allows, in particular for a lamella geometry with offset slat tips 28*a*, 28*b*, a simultaneous complete deflection of all slat tips 28*a*, 28*b* to be avoided. This reduces the maximum force during the expansion, and in particular during setting of slat springs 27*a*, 27*b*.

Indentation 15 between the plastic region and the metal region is not touched by slat tips 28*a*, 28*b* (FIGS. 2 and 3, zone IV). Firstly, less abrasion thus occurs as there is no travel over a material transition edge here. Secondly, due to indentation 15, no additional force peak occurs in the force-displacement characteristic during the transition from plastic body 12 to metal flat contact plug 11. Thirdly, loose particles may detach in the region of indentation 15 and remain in a region that is not touched by slat tips 28*a*, 28*b*.

LIST OF REFERENCE SYMBOLS

10 electrical contact element (plug contact element)
11 metal flat contact plug
12 plastic body
13, 13', 13" plug tip of the plastic body
14 side portions of the plastic body
15 indentation
16 bevel
17*a*, 17*b* edge contours of the plug tip
18 cross-sectional area of the plug tip
19 contact surface(s) of the metal flat contact plug
20 mating contact element (mating plug connector)
21 support component of the mating contact element
22 center axis of the cross-sectional area of the plug tip
26*a*, 26*b*, 26*c*, 26*d* contact slats (lamellae)
27*a*, 27*b* slat springs (lamellar springs)
28*a*, 28*b* slat tips (lamellar domes)
29 angular transition
a, b, c contact zones (touch surfaces) of the plug tip
a contact zone (sliding without expansion work)
b contact zone (expansion of the lamellar springs during the insertion operation)
c contact zone (relief of stress on the lamella during the insertion operation)
I, II, III, IV zones
I plastic plug bevel zone
II elevated zone
III valley zone
IV indented zone While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. An electrical contact element for a plug connector, the electrical contact element comprising:

a metal flat contact plug having an insertion-side end face and contact surfaces extending along an insertion direction; and a plastic body, the plastic body having a plug tip disposed on the insertion-side end face of the flat contact plug and extending along the insertion direction; and the plug tip having a cross-sectional area taken in a plane perpendicular to the insertion direction and including two opposing edge contours which extend along the insertion direction, and a cross-sectional width between the edge contours, measured perpendicular to a center axis of the cross-sectional area, varies continuously along the insertion direction to define a width profile, and the width profile includes a first local maximum and a second local maximum spaced apart from the first local maximum along the insertion direction, and a local minimum disposed between the first and second local maxima.

2. The electrical contact element of claim 1 wherein:

a transition at the insertion-side end face of the flat contact plug between each edge contour of the plug tip and each contact surface of the flat contact plug forms a concave indentation.

3. The electrical contact element of claim 1 wherein:

a transition at the insertion-side end face of the flat contact plug between the plug tip and the flat contact plug is an angular transition in a form of a bevel, a radius, an edge, or a polynomial shape.

4. The electrical contact element of claim 1 wherein:

the cross-sectional width between the edge contours further has a local minimum at the end region of the plug tip adjacent to the insertion-side end face of the flat contact plug.

5. The electrical contact element of claim 1 wherein:

the cross-sectional width between the edge contours further has a local minimum at the end region of the plug tip opposite to the insertion-side end face of the flat contact plug.

6. The electrical contact element of claim 1 wherein:

the cross-sectional width between the edge contours has a second local minimum at the end region of the plug tip adjacent to the insertion-side end face of the flat contact plug and a third local minimum at the end region of the plug tip opposite to the insertion-side end face of the flat contact plug.

7. The electrical contact element of claim 1 wherein:

the plastic body further includes two side portions disposed along opposite longitudinal sides of the flat contact plug and extending along the insertion direction.

8. A plug connector assembly comprising:

an electrical contact element having a metal flat contact plug and a plastic body extending along an insertion direction, the flat contact plug including an insertion-side end face and contact surfaces, the plastic body having a plug tip disposed on the insertion-side end face of the metal flat contact plug, the plug tip having a cross-sectional area including two undulated edge contours which extend symmetrically or asymmetrically with respect to a center axis of the cross-sectional area, and a cross-sectional width between the edge contours varies continuously along the plug tip and has at least one local maximum outside of end regions of the plug tip; and a mating contact element having multiple contact slats arranged in succession along the insertion direction, each contact slat including a resilient slat spring and a slat tip connected to the slat spring, the slat tips of the contact slats contacting the edge contours of the plug tip as the electrical contact element is partially inserted along the insertion direction into the mating contact element such that, as insertion progresses, different contact slats are deflected to different extents at different positions along the insertion direction, and the slat tips of the contact slats contacting the contact surfaces of the metal flat contact plug as the electrical contact element is fully inserted along the insertion direction into the mating contact element.

9. The plug connector assembly of claim 8 wherein:

the edge contours have a doubly undulated profile.

10. The plug connector assembly of claim 8 wherein:
the cross-sectional width between the edge contours has two local maximums and a local minimum outside of the end regions of the plug tip, the local minimum being between the two local maximums along the plug tip.

11. The plug connector assembly of claim 10 wherein:
the cross-sectional width between the edge contours further has a local minimum at the end region of the plug tip adjacent to the insertion-side end face of the flat contact plug.

12. The plug connector assembly of claim 10 wherein:
the cross-sectional width between the edge contours further has a local minimum at the end region of the plug tip opposite to the insertion-side end face of the flat contact plug.

13. The plug connector assembly of claim 10 wherein:
the cross-sectional width between the edge contours has a second local minimum at the end region of the plug tip adjacent to the insertion-side end face of the flat contact plug and a third local minimum at the end region of the plug tip opposite to the insertion-side end face of the flat contact plug.

14. The plug connector assembly of claim 8 wherein:
the edge contours extend symmetrically with respect to the center axis of the cross-sectional area.

* * * * *